Oct. 24, 1950 J. P. GIACOLETTO 2,527,125
TWO-WAY AMPLIFIER
Filed Feb. 3, 1948
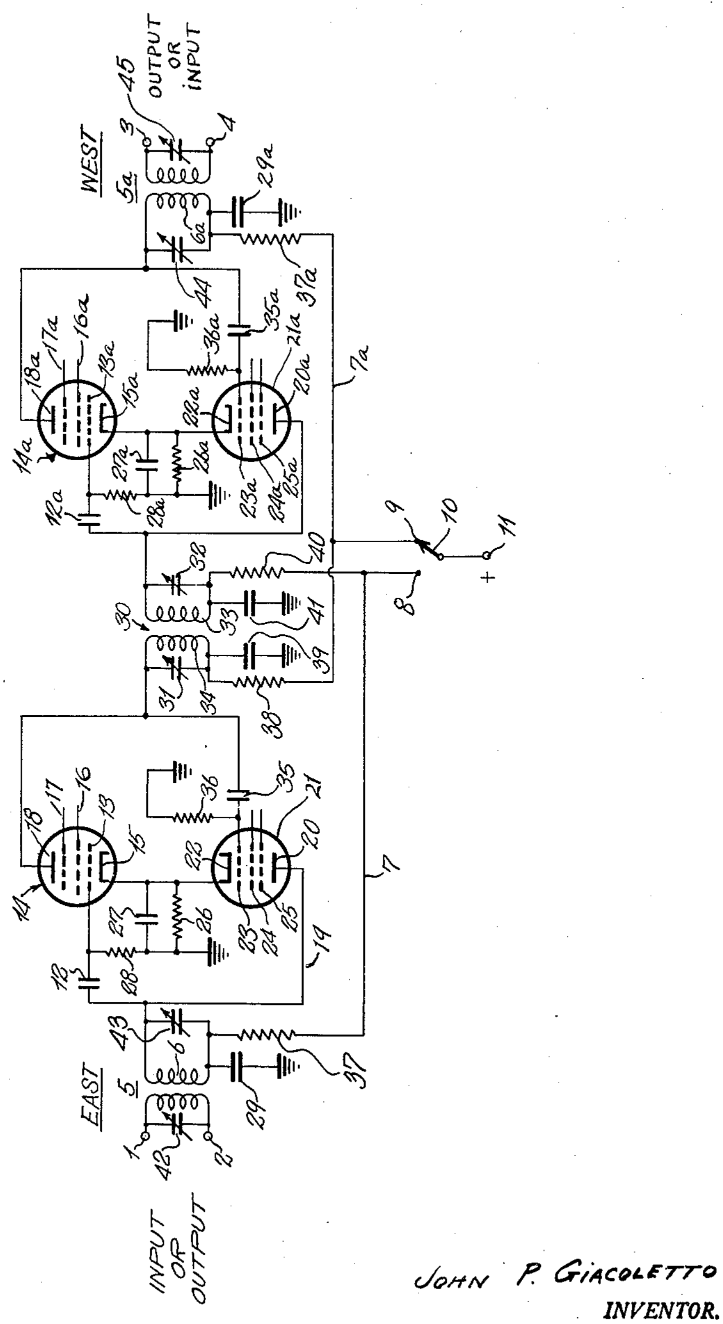
JOHN P. GIACOLETTO
INVENTOR.
BY John J. Rogan
ATTORNEY Patented Oct. 24, 1950 2,527,125

UNITED STATES PATENT OFFICE 2,527,125

TWO-WAY AMPLIFIER

John P. Giacoletto, Cedar Rapids, Iowa, assignor to Collins Radio Company, Cedar Rapids, Iowa, a corporation of Iowa Application February 3, 1948, Serial No. 6,001

6 Claims. (Cl. 179—170)

This invention relates to amplifiers and more particularly to multi-stage amplifiers which are capable of amplified transmission in opposite directions.

Heretofore, in multi-stage or cascade amplifiers of the two-way type using a coupling load impedance between the stages, it has been necessary to employ rather complicated switching arrangements so as not to disturb the balance of the system in either direction, and in many cases to employ so-called hybrid coils.

A principal object of the invention therefore, is to provide a multi-stage two-way amplifier employing a common coupling load impedance between the stages, and wherein the switching from transmission in one direction to transmission in the opposite direction is accomplished by a single switch which is required to control only the plate power supply potentials.

Another object is to provide a multi-stage switchable two-way amplifier requiring a minimum of circuit components.

A feature of the invention relates to a multi-stage amplifier having a single load impedance interconnecting the stages, which impedance is used for transmission in either direction through the amplifier. A simplified switching arrangement renders the amplifier effective in one direction while positively disabling it in the opposite direction.

Another feature relates to a multi-stage two-way amplifier with each stage having a pair of grid-controlled amplifier tubes, each pair having a common input-output circuit, and with a single load impedance between the stages; in conjunction with common grid-biasing means for each pair of tubes so connected that when one tube of the pair is effective for transmission in one direction the other tube of the pair is biased to positively prevent rectification of the input signals. Transmission in the undesired direction is prevented by removal of plate voltage.

A further feature relates to the novel organization, arrangement and relative interconnection of parts which cooperate to provide a simplified and improved two-way multi-stage amplifier.

In the drawing which shows, by way of example, one preferred embodiment of the invention, the numerals 1, 2, represent the composite input-output terminals for one end of the system. Likewise, the terminals 3, 4, represent the composite output and input terminals for the opposite end of the system. The terminals 1 and 2 are connected to a coupling transformer 5, whose secondary winding 6 is connected through resistor 37 to conductor 7 and thence to the terminal 8 of a single-pole double-throw switch 9. The movable arm 10 of this switch is connected to the positive terminal 11 of a suitable D. C. plate power supply. The other terminal of winding 6 is connected through D. C. blocking condenser 12 to the control grid 13 of a grid-controlled amplifier tube 14 of any well-known type, comprising for example the electron-emitting cathode 15, control grid 13, shield grid 16, suppressor grid 17, and output anode or plate 18. It will be understood of course that the invention is not limited to any particular type of amplifier tube providing it is of the grid-controlled type, and, while the drawing shows a typical pentode tube, any other form of grid-controlled amplifier tube may be employed. One terminal of the transformer secondary 6 is also connected by conductor 19 to the plate or output anode 20 of another grid-controlled amplifier tube 21 which may be similar to tube 14, and comprises the cathode 22, control grid 23, shield grid 24, suppressor grid 25 and the output anode 20. The cathode 15 and the cathode 22 are returned to ground through a common bias resistor 26 with the usual by-pass condenser 27. A suitable grid leak resistor 28 is also connected between control grid 13 and to ground; and the usual filter condenser 29 and filter resistor 37 are connected from one end of the secondary 6 to decouple the signal frequencies from the plate power supply.

The terminals 3, 4, are connected to a pair of tubes and circuit components similar to the tubes 14 and 21 and their circuit components. The parts which are analogous are designated by the same numerals with the suffix "*a*." The two pairs of tubes are coupled together by a single coupling transformer 30. The windings of transformer 30 are connected to the plate supply conductors 8, 9, through respective filters comprised of resistor 38 and by-pass condenser 39, and resistor 40 and by-pass condenser 41 to decouple the signal frequencies from the plate power supply. Merely for purposes of explanation, it will be assumed that the amplifier system shown on the drawing is an intermediate frequency amplifier in which event the two windings of the transformer 30 can be tuned to the same signal frequency by respective trimmer or tuning condensers 31, 32. Likewise, the transformers 5 and 5*a* can be tuned by respective condensers 42, 43, 44 and 45.

When transmission is to take place in the west-east direction, the switching arm 10 is closed on contact 8. This supplies the necessary D. C. plate potential through the winding 6 to the plate 20 of tube 21, and also through the winding 33 to the plate 20a of tube 21a. At the same time, the operating D. C. plate potential is disconnected from the plate 18 and the plate 18a. However, in order to insure that the tubes 14 and 14a do not act as rectifiers during the west-east transmission, their respective bias resistors 26 and 26a are such that the plate currents of tubes 21 and 21a flowing through respective resistors 26 and 26a, bias the grids of tubes 14 and 14a so that they do not act as rectifiers. If this common biasing arrangement were not provided, the tubes 14 and 14a might act as rectifiers on the signals present in the system and cause loss of amplification in the transmission.

When transmission is to take place in the east-west direction, switch arm 10 is moved to contact 9, thus applying D. C. plate potential through winding 34 to plate 18 and through winding 6a to plate 18a. At the same time, the operating D. C. plate potential is disconnected from plates 20 and 20a. In other words, during the west-east transmission the input signals at terminals 3 and 4, are applied across the control grid 23a and cathode 22a but they have no effect on the tube 14a which is biased to plate current cutoff and has its plate 18a disconnected from the plate power supply. The amplified signals from tube 21a are then applied to transformer 30 whose winding 34 is coupled to the control grid 23 by means of coupling condenser 35 and grid leak 36. These signals are then amplified in the tube 21 and are coupled to the terminals 1, 2, by transformer 5. Thus, for the west-east transmission, the amplifier consists of two stages, namely the tubes 21a and 21, and for east-west transmission it consists of two stages, namely tubes 14 and 14a. When transmission is effected in the east-west direction, the input signals at terminals 1 and 2 are applied across the control grid 13 and cathode 15 of tube 14, and are coupled by transformer 30 and thence through the coupling condenser 12a to the control grid 13a. The amplified signals in the output of tube 14a are then coupled by transformer 5a to the terminals 3, 4.

It will be observed that a single coupling unit 30 is all that is required between the two stages for transmission in either direction. This is of particular importance in so-called tuned amplifiers, such as intermediate frequency amplifiers of radio receivers and the like, and considerably reduces the complexity and cost of the equipment. It will be understood that the invention is not limited to the use of a coupling unit in the form of a transformer between the two stages and any other load impedance can be used for transmissions in the opposite directions. Furthermore, it is possible to effect the selective transmission in either direction by a simple manipulation of the single pole switch 9. The net result is an amplifier which is capable of operating selectively in either direction and which occupies a smaller space than conventional two-way amplifiers and does not require duplicate interstage coupling impedances or hybrid coils. While the invention has been illustrated in a two-stage amplifier, it will be understood that it is equally well applicable to amplifiers of more than two cascaded stages.

While one particular embodiment has been illustrated in the drawing, it will be understood that various changes and modifications may be made therein without departing from the spirit and scope of the invention.

What is claimed is:

1. A multi-stage two-way signal amplifier, comprising a first pair of grid-controlled electron tubes, a second pair of grid-controlled electron tubes, a single source of positive plate potential for all the tubes, switch means effective in one position to apply D. C. plate potential to corresponding tubes in said pairs while disconnecting the plate potential from the remaining tubes of said pairs, and a common impedance connected between the first and second pair of tubes for coupling the corresponding tubes of said pairs for selective transmission as cascaded amplifier stages in either direction through the amplifier.

2. A two-way signal amplifier, comprising first and second grid-controlled electron tubes providing cascaded amplifier stages for signal transmission in one direction through the amplifier, third and fourth grid-controlled tubes providing cascaded amplifier stages for signal transmission in the opposite direction through the amplifier, a single coupling device connected to act as a coupling load impedance between the first and second tubes and also as a coupling load impedance between the third and fourth tubes, a source of D. C. plate supply for all the tubes, and a switch for selectively connecting said supply to the first and second tubes as a pair and to the third and fourth tubes as a pair.

3. A two-way signal amplifier, comprising first and second grid-controlled tubes providing cascaded amplifier stages for signal transmission in one direction through the amplifier, third and fourth grid-controlled tubes providing cascaded amplifier stages for signal transmission in the opposite direction through the amplifier, a single interstage coupling device for transmission in both said directions, a source of D. C. supply for said tubes, switch means effective in one position to connect said source to the plate electrodes of the first and second tubes only and means effective in response to the plate current flowing through said first and second tubes for biasing the third and fourth tubes against rectification.

4. A two-way signal amplifier, comprising first, second, third and fourth grid-controlled amplifier tubes, a first composite input-output circuit, a second composite output-input circuit, means connecting the first input-output circuit to the control grid of the first tube and to the plate of the third tube, means connecting the second output-input circuit to the control grid of the fourth tube and to the plate of the second tube, an interstage coupling transformer for coupling the output of the first tube to the control grid of the second tube for cascaded amplification and for coupling the output of the fourth tube to the control grid of the third tube for cascaded amplification, a source of D. C. plate supply potential for all tubes, and switch means effective in one position to connect said source to the plates of the first and second tubes only and effective in another position to connect said source to the plates of the third and fourth tubes only.

5. A two-way signal amplifier, comprising a first pair of grid-controlled electron tubes for amplifying in cascade in one direction through the amplifier, a second pair of grid-controlled tubes for amplifying in cascade in the opposite direction through the amplifier, a coupling transformer for coupling the output of the first tube of the first pair to the input of the second tube of the first pair and for coupling the output of the first tube of the second pair to the input of the second tube of the second pair, a source of D. C. plate supply potential for all said tubes, a switch effective in one position to connect said source to the plates of said first pair of tubes only, and effective in another position to connect said source to the plate of the second pair of tubes only, a common cathode bias resistor for the first tube of the first pair and the second tube of the second pair, another common cathode bias resistor for the second tube of the first pair and the first tube of the second pair, and circuit connections for causing said bias resistors to bias the control grids of one pair of tubes to prevent their acting as rectifiers.

6. A two-way amplifier, comprising a first pair of cascaded grid-controlled tubes for transmission in one direction through the amplifier, a second pair of cascaded grid-controlled electron tubes for transmission in the opposite direction through the amplifier, a common interstage coupling transformer for all the tubes, a common input-output circuit connected to the input of the first pair of cascaded tubes and to the output of the second pair of cascaded tubes, another common output-input circuit connected to the output of said first pair of cascaded tubes and to the input of said second pair of cascaded tubes, a source of D. C. plate supply for all the tubes, and switch means effective in one position to connect said source to the plates of the first pair of cascaded tubes only and effective in another position to connect said source to the plates of the second pair of cascaded pair of tubes only, and grid biasing means controlled by the plate current in one pair of cascaded tubes for biasing the control grids of the other pair of cascaded tubes to prevent grid rectification.

JOHN P. GIACOLETTO.

REFERENCES CITED

The following references are of record in the file of this patent:

UNITED STATES PATENTS

| Number | Name | Date |
|---|---|---|
| 1,462,057 | Wold | July 17, 1923 |
| 1,462,368 | Latour | July 17, 1923 |
| 2,021,638 | Ramlau | Nov. 19, 1935 |
| 2,327,248 | Case | Aug. 17, 1943 |